United States Patent
Raghu

(10) Patent No.: US 11,124,290 B2
(45) Date of Patent: Sep. 21, 2021

(54) INTEGRATED AERODYNAMIC FLOW CONTROL SYSTEM WITH AIR SOURCE

(71) Applicant: Advanced Fluidics LLC, Columbia, MD (US)

(72) Inventor: Surya Raghu, Ellicott City, MD (US)

(73) Assignee: Advanced Fluidics LLC, Columbia, MD (US)

(*) Notice: Subject to any disclaimer, the term of this patent is extended or adjusted under 35 U.S.C. 154(b) by 820 days.

(21) Appl. No.: 15/962,963

(22) Filed: Apr. 25, 2018

(65) Prior Publication Data

US 2018/0370617 A1    Dec. 27, 2018

Related U.S. Application Data

(60) Provisional application No. 62/522,787, filed on Jun. 21, 2017.

(51) Int. Cl.
*B64C 21/04* (2006.01)
(52) U.S. Cl.
CPC .......... *B64C 21/04* (2013.01); *B64C 2230/18* (2013.01)
(58) Field of Classification Search
CPC ........................... B64C 21/04; B64C 2230/18
See application file for complete search history.

(56) References Cited

U.S. PATENT DOCUMENTS

| 5,366,177 | A | 11/1994 | DeCoux |
| 6,247,671 | B1 | 6/2001 | Saeks et al. |
| 6,253,782 | B1* | 7/2001 | Raghu ............... B05B 1/08 137/14 |
| 6,484,971 | B2 | 11/2002 | Layukallo |
| 8,382,043 | B1 | 2/2013 | Raghu |
| 8,640,995 | B2 | 2/2014 | Corke et al. |
| 8,690,106 | B1 | 4/2014 | Reissig |
| 9,120,563 | B2 | 9/2015 | Raghu |
| 9,239,039 | B2 | 1/2016 | Herr et al. |
| 9,346,536 | B2 | 5/2016 | Raghu |
| 9,714,082 | B2 | 7/2017 | Shmilovich et al. |
| 9,718,084 | B2 | 8/2017 | Bolyard, Jr. |
| 9,718,538 | B2 | 8/2017 | Seifert et al. |
| 9,897,118 | B2 | 2/2018 | Raghu |
| 2012/0091266 | A1* | 4/2012 | Whalen ............... B64C 23/005 244/87 |

(Continued)

OTHER PUBLICATIONS

Whalen, E., "Flight Test of an AFC Enhanced Vertical Tail," AIAA Aviation Forum, 8th AIAA Flow Control Conference, Jun. 13-17, 2016, pp. 1-8, Washington, D.C.

(Continued)

*Primary Examiner* — Nicholas McFall
(74) *Attorney, Agent, or Firm* — Rahman LLC

(57) ABSTRACT

An aerodynamic flow control system includes a plurality of actuator units integrated at predetermined locations along a span of an aerodynamic surface of a vehicle to provide aerodynamic active air flow control, wherein each of the plurality of actuator units includes an electrically powered compressor to compress air; a transitional component to receive the compressed air from the compressor and provide two streams of the compressed air; and a fluidic oscillator having two inlet ports that receive the two streams of the compressed air, and an exit port that discharges a single oscillating flow of air at a predetermined velocity.

20 Claims, 13 Drawing Sheets

(56) References Cited

U.S. PATENT DOCUMENTS

2016/0261224 A1* 9/2016 Madrone ................. F15B 15/10
2016/0272301 A1* 9/2016 Shmilovich ............. B64C 21/04
2017/0361918 A1 12/2017 Rabadan

OTHER PUBLICATIONS

Mooney, H., "AFC-Enabled Vertical Tail System Integration Study," NASA Report No. NASA/CR-2014-218168, Mar. 2014, 66 pages.

Shmilovich, A., et al., "Numerical Simulations of an Airplane with an Active Flow Control System," AIAA Aviation Forum, 8th AIAA Flow Control Conference, Jun. 13-17, 2016, pp. 1-15, Washington, D.C.

Dowgwillo, R., "A Stake in the Ground: How Boundary Layer Conlrol Was Implemented on a Production Tactical Aircraft," AIAA SciTech Forum, 2018 AIAA Aerospace Sciences Meeting, Jan. 8-12, 2018, pp. 1-14, Kissimmee, FL.

* cited by examiner

INTEGRATED AERODYNAMIC FLOW CONTROL SYSTEM WITH AIR SOURCE

CROSS REFERENCE TO RELATED APPLICATION

This application claims the benefit of U.S. Provisional Patent Application No. 62/522,787 filed on Jun. 21, 2017, the contents of which, in its entirety, is herein incorporated by reference.

GOVERNMENT INTEREST

This invention was made with Government support under contract NNX16CL51P awarded by NASA. The Government has certain rights in the invention.

BACKGROUND

Technical Field

The embodiments herein generally relate to fluid control mechanisms, and more particularly to active flow control of air flow over an aerodynamic surface using air jets with sweeping motion.

Description of the Related Art

Active flow control is being pursued to improve the aerodynamic performance of an airplane, as well as unmanned aerial vehicles (UAVs). For example, it results in reduction in aerodynamic drag, increased lift during landing and take-off, and increased rudder force that results in reduction in size of vertical tail culminating in significant cost savings. Considering numerous advantages, active flow control is now considered essential during designing of future passenger and military airplanes.

Active flow control using fluidic jets that produce a sweeping motion of jets exiting from actuators thereby affecting overall air flow patterns and hence the aerodynamic performance, has been found to be most promising. However, implementation of this active flow control method needs a massive compressed air source unit. Moreover, distribution of air from the source to the individual flow control actuators located far away from the compressed air source unit requires extensive fluidic plumbing, which increases weight. Extensive plumbing also results in pressure drop along the plumbing lines resulting in requirement of larger diameter pipes. All these factors result in increased demand for lift force, which in turn needs larger wings and thus culminating into a spiral of increased penalties than savings, and which is counter-productive to the purpose of utilizing the active flow control. Moreover, an arbitrary combination of the elements of the system is not possible because of geometric constraints and also matching of the compressor capability and actuator requirements.

SUMMARY

In view of the foregoing, an embodiment herein provides an aerodynamic flow control system comprising a plurality of actuator units integrated at predetermined locations along a span of an aerodynamic surface of a vehicle to provide aerodynamic active air flow control, wherein each of the plurality of actuator units comprises an electrically powered compressor to compress air; a transitional component to receive the compressed air from the compressor and provide two streams of the compressed air; and a fluidic oscillator comprising two inlet ports that receive the two streams of the compressed air, and an exit port that discharges a single oscillating flow of air at a pre-determined velocity.

The fluidic oscillator may comprise a feedback-free fluidic oscillator, and wherein the transitional component is to provide two equal streams of the compressed air to the two inlet ports of the fluidic oscillator. The single oscillating flow of air may be either in-plane or perpendicular to a plane defined by fluid flow through any one of the plurality of actuator unit. The electrically powered compressor may have a capacity to provide output of up to approximately 180 kg/hour at a pressure of up to approximately 100 psi. Each of the plurality of actuator units may comprise a single compressor and a single transitional component, and wherein the single transitional component comprises a transition flow geometry that divides a flow of the compressed air from the single compressor into two equal parts for feeding the two streams of the compressed air to the two inlet ports of the fluidic oscillator, and further conditions the two streams for uniformity in the form of two converging nozzles that act as inputs to the feedback-free fluidic oscillator. Each of the plurality of actuator units may comprise two compressors and two transitional components to independently provide two equal streams of the compressed air to each of the two inlet ports of the fluidic oscillator such that each of the two equal streams is conditioned for uniformity in the form of two converging nozzles that act as inputs to the feedback-free fluidic oscillator.

The transitional component may comprise a flexible material, wherein the transitional component may be configured to orient the flow of air in relation to a flow of air external to an actuator unit. Flexibility of the transitional component may allow air flow adjustments in all three planes relative to the aerodynamic surface. The fluidic oscillator may provide an oscillation between approximately 200-800 Hz. Each of the plurality of actuator units may comprise a battery pack for supplying electric power to the electrically powered compressor. The compressor may be individually switched ON and OFF based on a programmable amount and location of aerodynamic active air flow control through the plurality of actuator units. An amount of mass flow through the fluidic oscillator may be regulated either by an electrical input to the compressor, or by controlling an inlet area of the compressor. The plurality of actuator units may be arranged into an array on any of a planar surface structure and a non-planar surface. The exit port of the fluidic oscillator of each of the plurality of actuator units may be configured in any of a single plane and a staggered configuration. The plurality of actuator units may be arranged in multiple rows.

Another embodiment provides an aerodynamic flow control system comprising a plurality of actuator units integrated at predetermined locations along a span of an aerodynamic surface of a vehicle to provide aerodynamic active air flow control, wherein each of the plurality of actuator units comprises an electrically powered compressor to compress air; a transitional component to receive the compressed air from the compressor and provide two streams of the compressed air; and a fluidic oscillator comprising two inlet ports that receive the two streams of the compressed air, and an exit port that discharges a single oscillating flow of air at a predetermined velocity. The aerodynamic flow control system further comprises a sensor attached to each of the plurality of actuator units to capture air flow data related to the actuator unit; and a processor operatively connected to each sensor and each of the plurality of actuator units to compare the air flow data to a predetermined air flow threshold, and control an operation of the plurality of actuator units based on the comparison.

Another embodiment provides a method comprising integrating a plurality of actuator units at predetermined locations along a span of an aerodynamic surface of a vehicle to provide aerodynamic active air flow control; compressing air using a separate electrically powered compressor for each actuator unit; transform, by each actuator unit, the compressed air into two streams of compressed air; and discharging, by each actuator unit, the two streams of compressed air as a single oscillating flow of air at a predetermined velocity, wherein the single oscillating flow of air is either in-plane or perpendicular to a plane defined by fluid flow through any one of the plurality of actuator units. The method may comprise selectively switching ON and OFF individual ones of the plurality of actuator units based on a programmable amount and location of aerodynamic active flow control through the plurality of actuator units. The method may comprise regulating a mass flow through the plurality of actuator units either by an electrical input to a compressor of each actuator unit, or by controlling an inlet area of the compressor. The method may comprise arranging the plurality of actuator units into an array on any of a planar surface structure and a non-planar surface.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
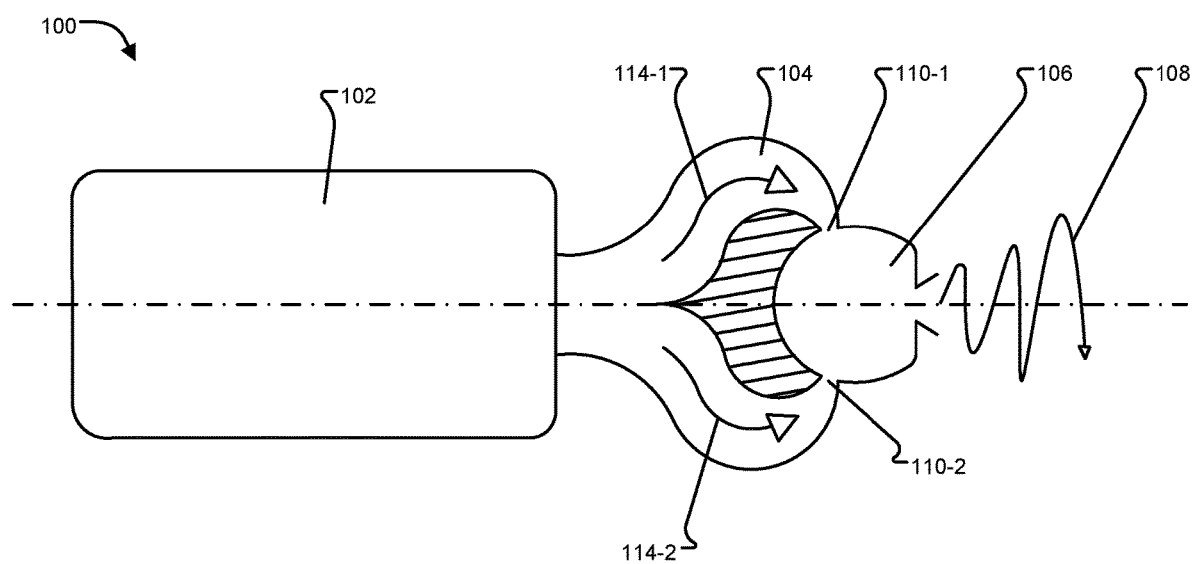
FIG. 1 is an exemplary top view showing a general configuration of an actuator unit that includes a compact air compressor, a transitional component, and a colliding-jet fluidic oscillator, according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a system and method for aerodynamic flow control that is based on compact and integrated packaging of air source and individual fluidic oscillator that produces a jet with sweeping motion. A plurality of individual fluidic oscillators, each integrated with a dedicated air source, can be integrated into the wing section of an airfoil of an airplane wing, a flap, or a tail rudder for aerodynamic active flow control, without the need for a centralized compressed air source unit, and extensive plumbing and valves connecting the individual actuators to the centralized compressed air source unit.

The embodiments herein relate to a system and method for aerodynamic active flow control that are based on a plurality of actuator units, wherein each actuator unit integrates a compressor to meet its compressed air requirement. A plurality of such integrated actuator units, when integrated into the wing section of an airfoil of an airplane wing, a flap, or a tail rudder for aerodynamic active flow control, does away with the need for a centralized compressed air source unit, and extensive plumbing and valves connecting the individual actuators to the centralized compressed air source unit; but simultaneously poses a number of challenges in meeting the requirement of aerodynamic active flow control.

For example, all components of the actuator units should conform, individually and in assembly, to the geometrical constraints of length, height and width to fit into the wing, flap, fuselage or any aerodynamic surface that needs flow control. For example, in order to prevent overlap between two adjacent actuator units, maximum width of the actuator units should be less than minimum spacing between the actuators required for optimal effectiveness of flow control. In addition, the actuator should be sized to match the needs of flow control over an aerodynamic surface during flight speeds when the actuation is required, and hence the exit width of the jet is to be maintained between 8 mm and 15 mm and nozzle exit height is to be maintained between 4 mm and 10 mm. Further, the compressor integrated with the actuator should deliver compressed air at rates of up to 2200 liters/min (0.05 kg/s), and in order to produce sonic velocities at the exit of the actuator at sea level, pressure ratio; i.e., nozzle pressure to ambient pressure, should be at least 2.

Besides the above dimensional and functional requirements, the integrated actuator unit should also be easily serviceable to maintain the aerodynamic active flow control system in good condition. For this, part of the actuator unit should be modular so that each of these can be easily disconnected and replaced by a new part, when found to need replacement after inspection. Referring now to the drawings, and more particularly to FIGS. 1 through 9, where similar reference characters denote corresponding features consistently throughout the figures, there are shown exemplary embodiments.

Figure 2:
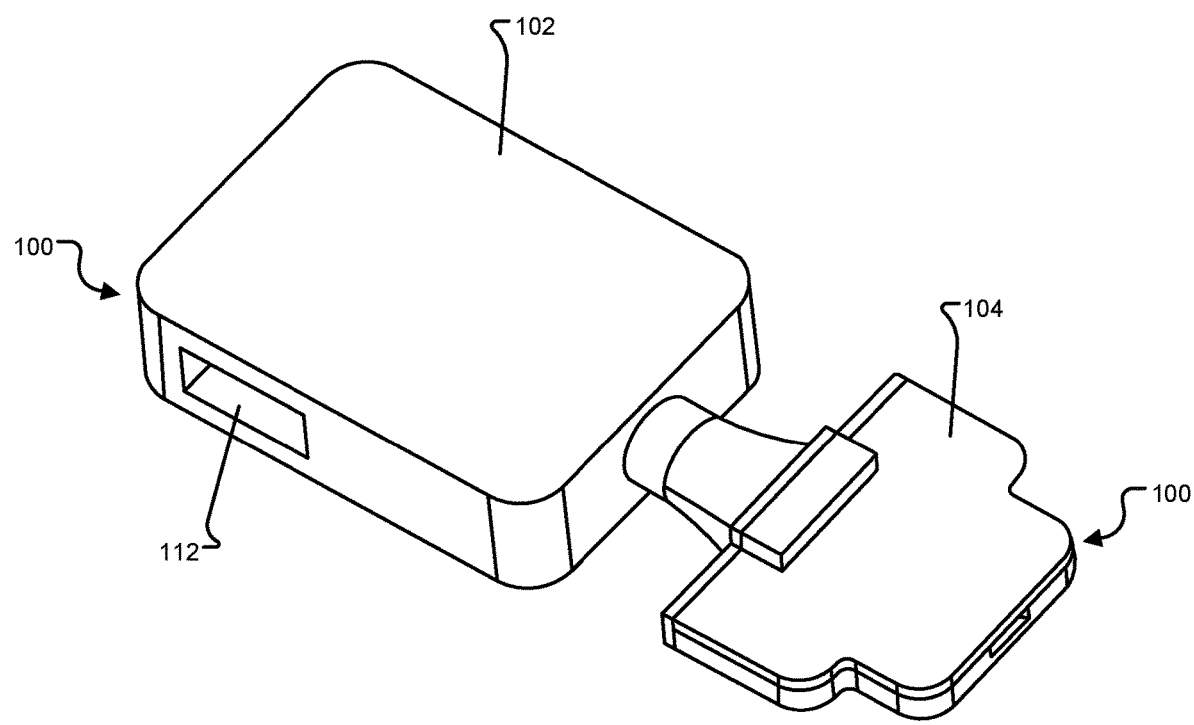
FIG. 2 is an exemplary perspective view of the actuator unit, according to the embodiments herein.

Referring to FIGS. 1 and 2, each actuator unit 100 comprises an air compressor 102, a transitional component 104, and a fluidic oscillator 106. The air compressor 102 can be a compact electrically or hydraulically powered compressor capable of producing high-pressure air pressurized up to 100 psi. Flow of the compressed air is directed into the fluidic oscillator 106 through the transitional component 104 that divides the compressed air flow into two equal streams that enter two inlets such as 110-1 and 110-2 (collectively referred to as inlets 110) of the fluidic oscillator 106. The output of the fluidic oscillator 106 is a high velocity exit jet 108 reaching sonic speeds, with a sweeping motion.

In an embodiment, the fluidic oscillator 106 can be a feedback-free oscillator. For example, the fluidic oscillator 106 can be a colliding jet fluidic oscillator having modified geometry for the present purpose of producing the high velocity exit jet 108 with the sweeping motion.

The compact air compressor 102 is adapted to provide up to about 180 kg/hour of air at high pressures of up to 100 psi. The amount of mass flow can be regulated either by the electrical input to the compressor 102, or by controlling the inlet area 112 (refer to FIG. 2) of the compressor 102. The output of the compressor 102 is led into the transitional component 104.

Figure 3:
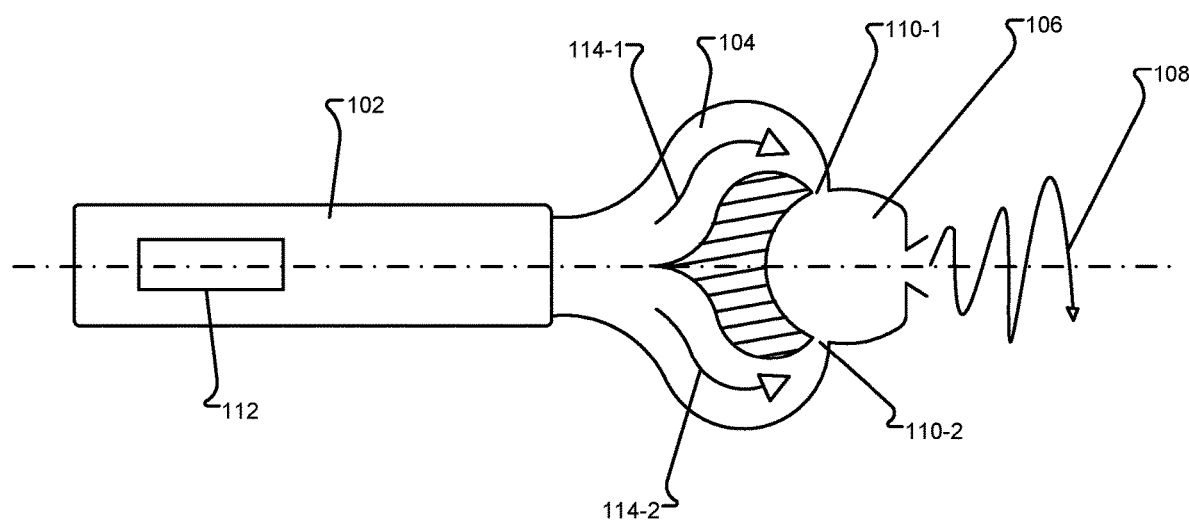
FIG. 3 is an exemplary top view showing a general configuration of an actuator unit that includes the air compressors in vertical configuration, according to the embodiments herein.

While the examples of FIGS. 1 and 2 show the compressor 102 generally lying in plane of the fluidic oscillator 106, it is possible to have a perpendicular arrangement of the air compressor 102 with respect to the plane of the fluidic oscillator 106 as shown in FIG. 3, or in any other orientation. Any of the possible orientations can be adapted depending on availability of space for locating the fluidic oscillator 106.

Figure 4:
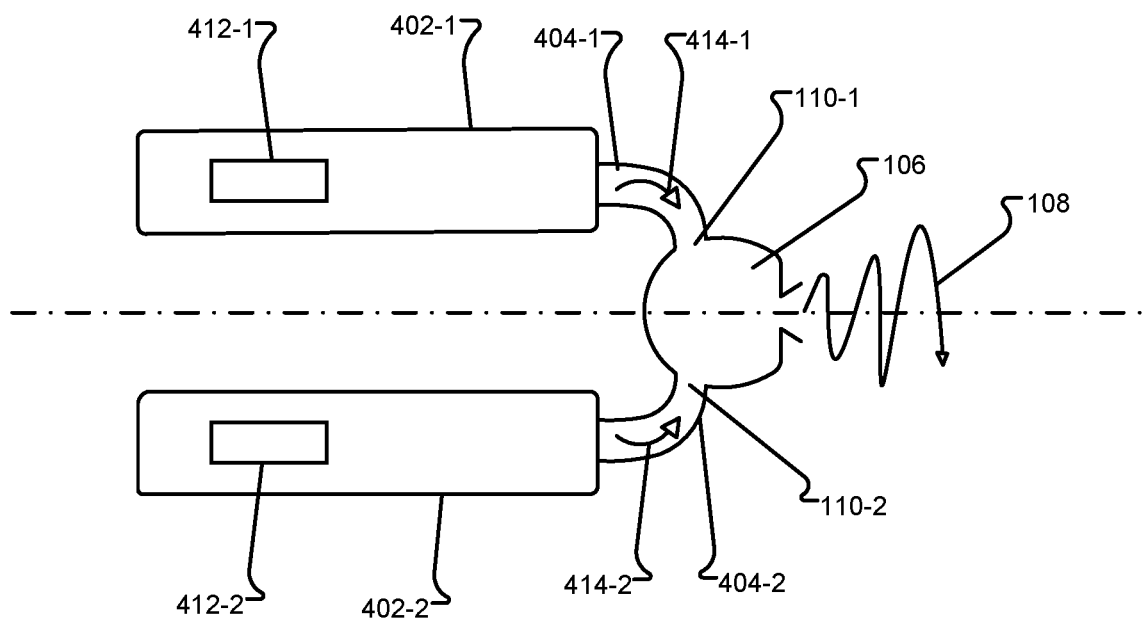
FIG. 4 is an exemplary top view showing a general configuration of an actuator unit that includes two air compressors coupled to the fluidic oscillator through two transitional components, according to the embodiments herein.

Further, while the examples of FIGS. 1 and 2 show a single compressor 102 supplying the compressed air to the two inlets 110 of the fluidic oscillator 106, it is possible to have two separate compressors, each of the two compressors (compressor 402 as shown in FIG. 4) feeding compressed air to one of the two inlets 110 of the fluidic oscillator 106.

FIG. 4, with reference to FIGS. 1 through 3, is an exemplary top view showing a general configuration of an actuator unit 100 that includes two air compressors 402-1 and 402-2 (collectively referred to as 402), coupled to the fluidic oscillator 106 through two transitional components 404-1 and 404-2 (collectively referred to as 404) respectively. Each of the two compressors 402 can have its own inlet area such as 412-1 and 412-2 (collectively referred to as 412). In a two-compressor configuration of the actuator unit 100, each compressor 402 can have the capacity to supply compressed air at 90 kg/hour of air at high pressures of up to 100 psi so that a total of 180 kg/hour of air is available to the fluidic oscillator 106 to provide an oscillating jet of an appropriate flow rate.

As stated earlier, the compressor 102/402 may be an electrically driven compressor, and electric power for the compressor 102/402 can be drawn from a main engine generator or in emergency, from a battery of the aerial vehicle. In an alternative embodiment, each actuator unit 100 can incorporate an integrated battery pack 606 (refer to FIG. 6) to meet the electric power requirement of the compressor 102/402. The battery pack 606 can be replaced periodically upon appropriate inspection cycles. In an alternate embodiment, the compressor 102 can be hydraulically driven.

In an embodiment, the transitional component 104 can have a transition flow geometry that divides the flow into two equal streams 114-1 and 114-2 (collectively referred to as 114), and in addition, conditions the flow for uniformity in form of two converging nozzles that act as inputs to the fluidic oscillator 106. The transitional component 104 is configured to transfer the compressed air produced by the compressor 102, to the fluidic oscillator 106 without internal flow separation to prevent energy loss in the flow, hence the divergence angle is maintained less than seven degrees, according to an example.

In an embodiment, the transitional component 104 can be made of a rigid or flexible, high strength, durable material that can withstand internal pressure of up to 100 psi. The geometry of the fluid path in the transitional component 104 is configured to minimize pressure losses during flow of air from the compressor 102 to the fluidic oscillator 106. For ease of manufacturing, the transitional component 104 and the fluidic oscillator 106 can be fabricated as one single entity, such as but not limited to, using 3-D printing technology.

Figure 5:
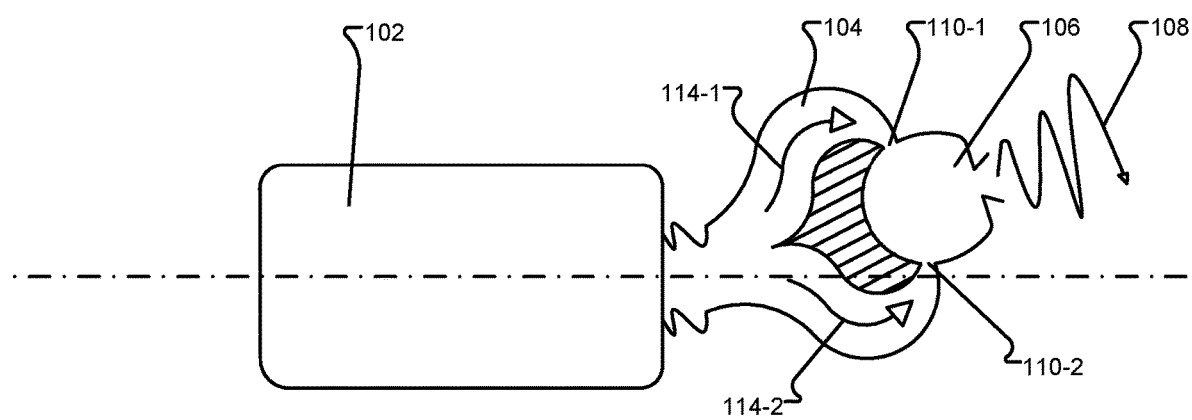
FIG. 5 is an exemplary top view showing arrangement of the actuator unit with a flexible transitional component enabling the exit jet to be oriented in a desired direction, according to the embodiments herein.

FIG. 5, with reference to FIGS. 1 through 4, is an exemplary top view showing the arrangement of the actuator unit 100 with a flexible transitional component 104 enabling the exit jet 108 to be oriented in a desired direction. In an embodiment, use of a flexible material for the transitional component 104 results in providing the ability for proper orientation of the exit jet 108 in relation to the external flow, such as 702 and 722 shown in FIGS. 7A and 7B. This flexible transitional component 104 also helps in overcoming some of the geometric constraints within the space where actuator unit 100 has to be placed, such as inside the wing, flap, or tail of the aircraft as shown in FIGS. 7A to 7D. Flexibility of the transitional component 104 enables easy orientation into all three planes and also slight rotation of the fluidic oscillator 106 for optimum orientation.

The actuator units 100 may be assembled in modules—the compressor 102/402, the transitional component 104/404, and the fluidic actuator 106. The fluidic actuator 106 does not require any maintenance as it does not include any moving parts. The transitional component 104/404 could be either flexible aluminum or rubber/plastic hosing, and may be easy to replace during typical inspections. The compressor 102/402 is also replaceable and can be replaced based on the life-cycle studies. If a battery pack, such as battery pack 606 shown in FIG. 6, is integrated with each of these actuator units 100, then such battery packs can be replaced upon appropriate inspection cycles.

Figure 6:
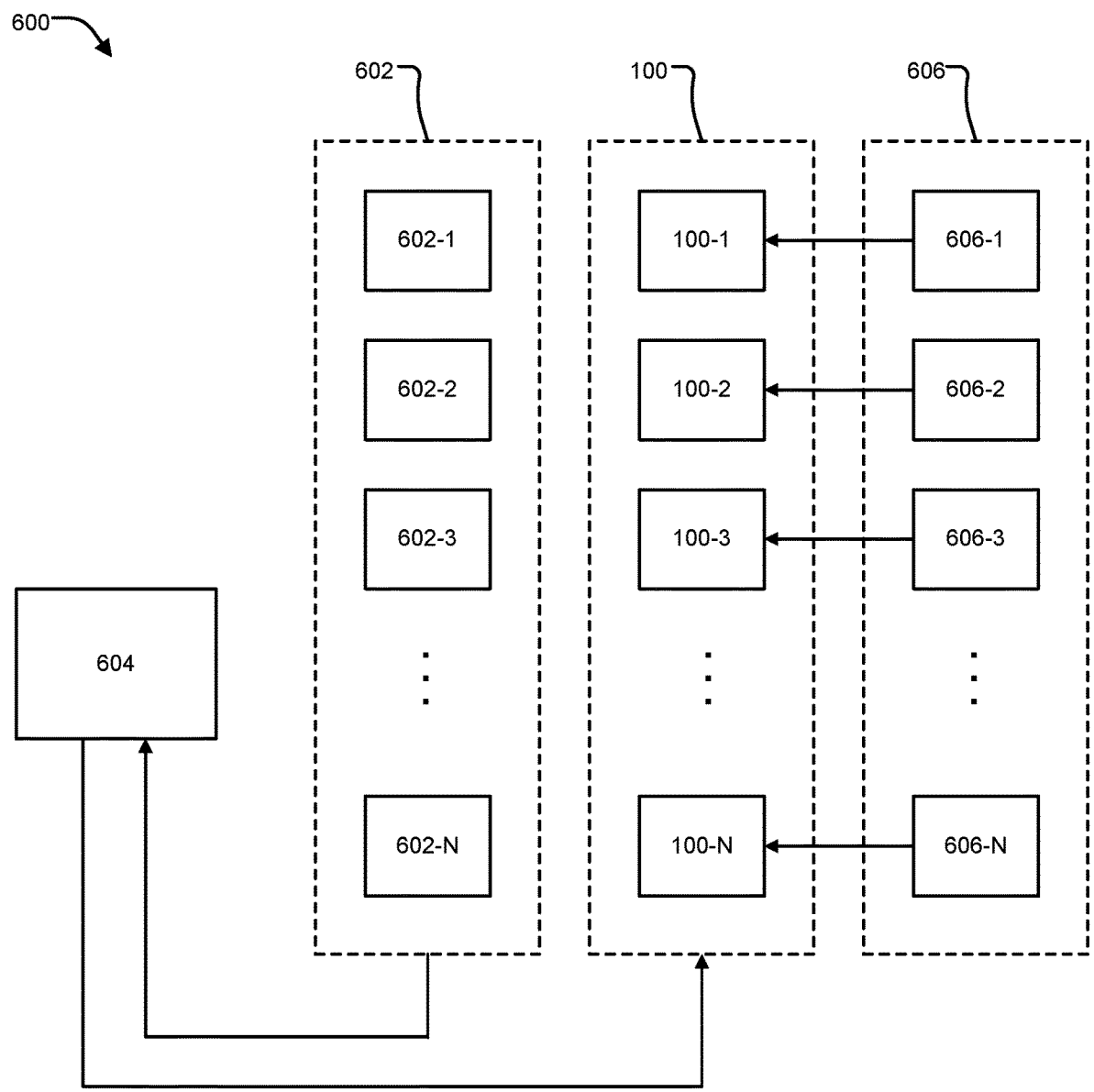
FIG. 6 is an exemplary block diagram for the disclosed system for active aerodynamic flow control, according to the embodiments herein.
Figure 7A:
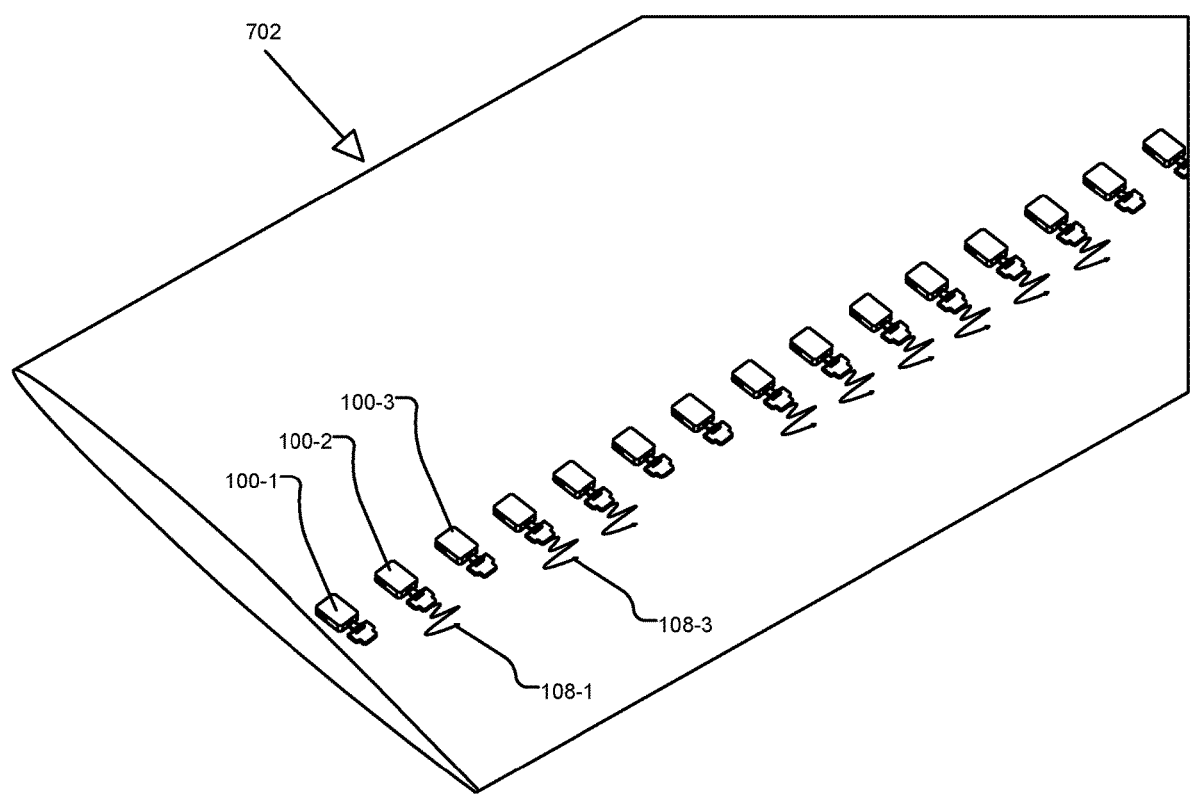
FIG. 7A illustrates an exemplary arrangement of a plurality of actuator units in different locations of an airplane, according to the embodiments herein.
Figure 7B:
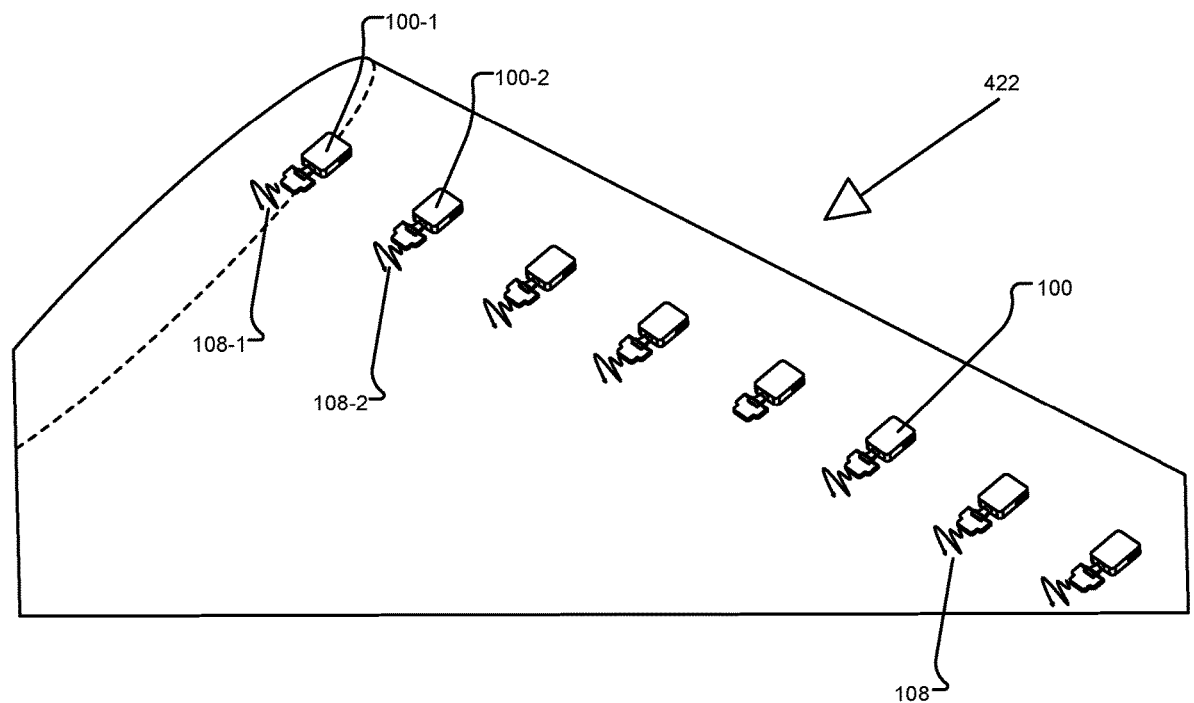
FIG. 7B illustrates an exemplary arrangement of a plurality of actuator units along leading side of a wing of an airplane, according to the embodiments herein.
Figure 7C:
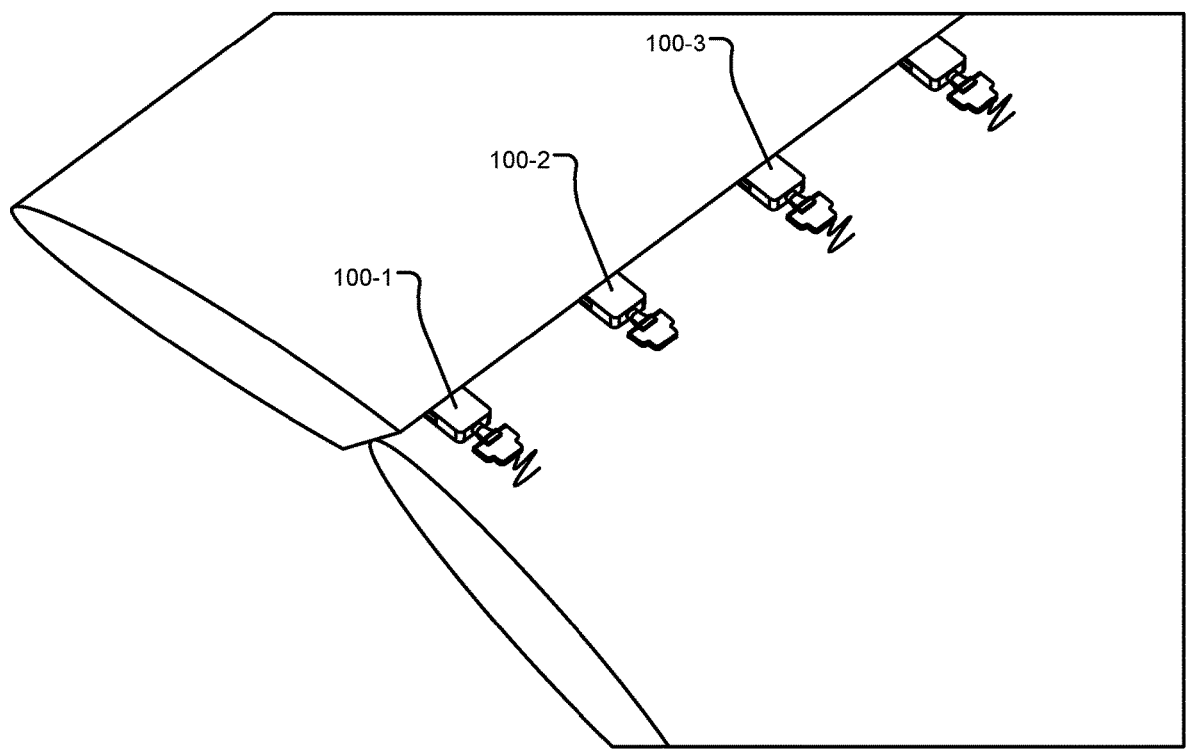
FIG. 7C illustrates yet another exemplary arrangement of a plurality of actuator units along leading side of a wing an airplane, according to the embodiments herein.
Figure 7D:
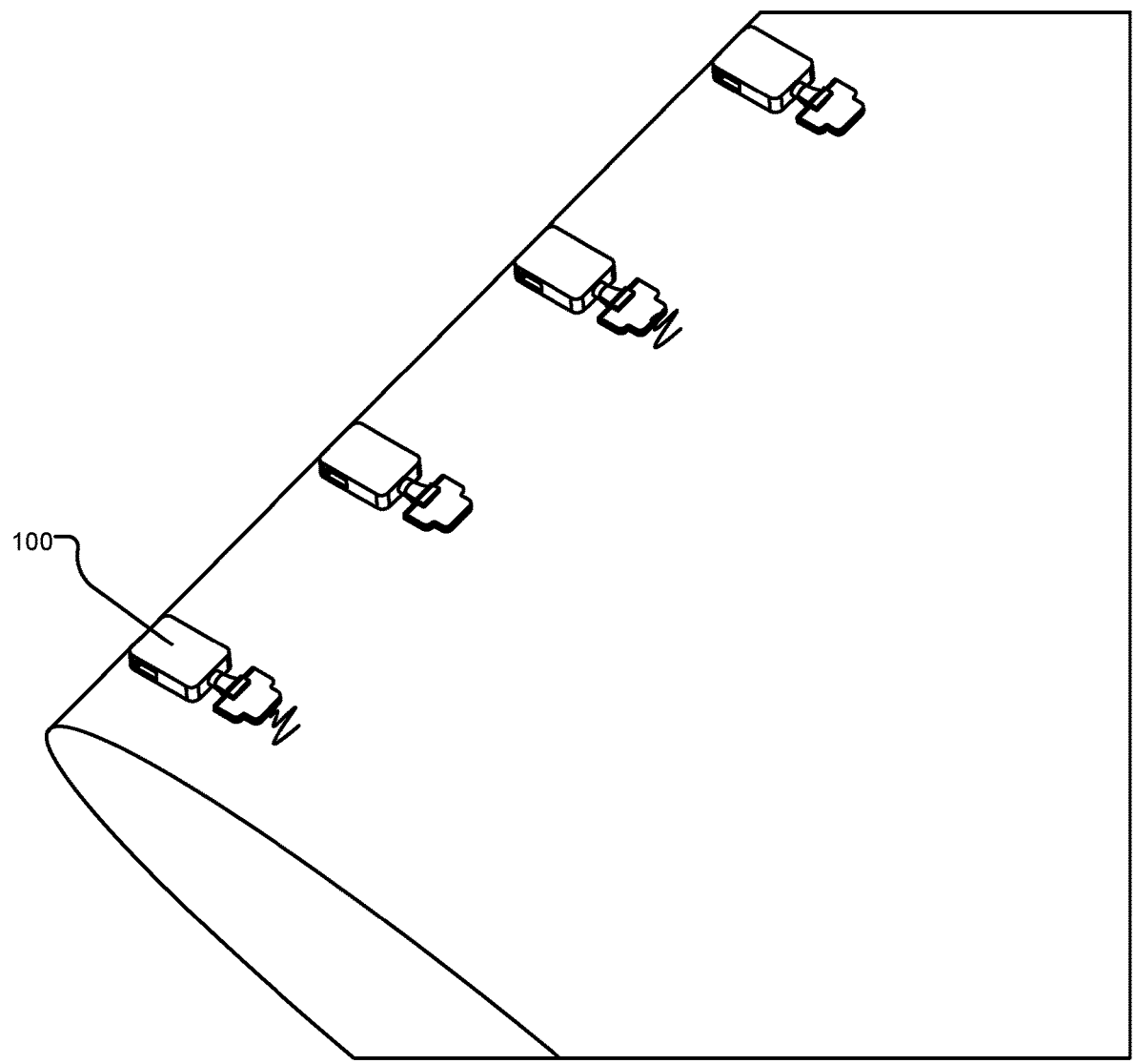
FIG. 7D illustrates an exemplary arrangement of a plurality of actuator units along a wing of an airplane, according to the embodiments herein.

FIG. 6, with reference to FIGS. 1 through 5, is an exemplary block diagram for a system 600 for active aerodynamic flow control, wherein the aerodynamic flow control system 600 can incorporate one or more of actuator units 100 such as 100-1, 100-2, and so on, placed at desired locations along the span of the aerodynamic surfaces as shown in FIGS. 7A to 7D, with reference to FIGS. 1 through 6, to obtain the most optimal flow control performance. The system 600 can further comprise a sensor 602 attached to each of the plurality of actuator units 100. For example, sensor 602-1 attached to actuator units 100-1, sensor 602-2 attached to actuator units 100-2, and so on, (collectively referred to as sensor 602) to capture air flow data related to the corresponding actuator unit 100. The sensors 602 can be a mass flow sensor configured to measure airflow velocity in vicinity of the corresponding actuator unit 100, for example, based on heat transfer flow and differential pressure, and provide proportionate voltage output. The system 600 can further comprise a processor 604 operatively connected to each sensor 602, and to each of the plurality of actuator units 100. The processor 604 can be any type of processor such as a central processing unit (CPU), microprocessor, controller, other type of processing unit capable of executing computer-implemented instructions. The processor 604 can receive air flow data from the sensor 602 attached to actuator units 100 and provide output for controlling operation of the plurality of actuator units 100. Processing by the processor 604 can involve comparison of the air flow data received from each of the sensor 602, with a predetermined air flow threshold, and providing, based on the comparison, operation parameters for the corresponding actuator unit 100 to achieve a desired aerodynamic active air flow control. Also shown in FIG. 6 are battery packs such as 606-1, 606-2, . . . etc. (collectively referred to as battery pack 606), each battery pack 606 coupled to an actuator unit 100 to meet power requirement of the corresponding actuator unit 100.

Figure 8A:
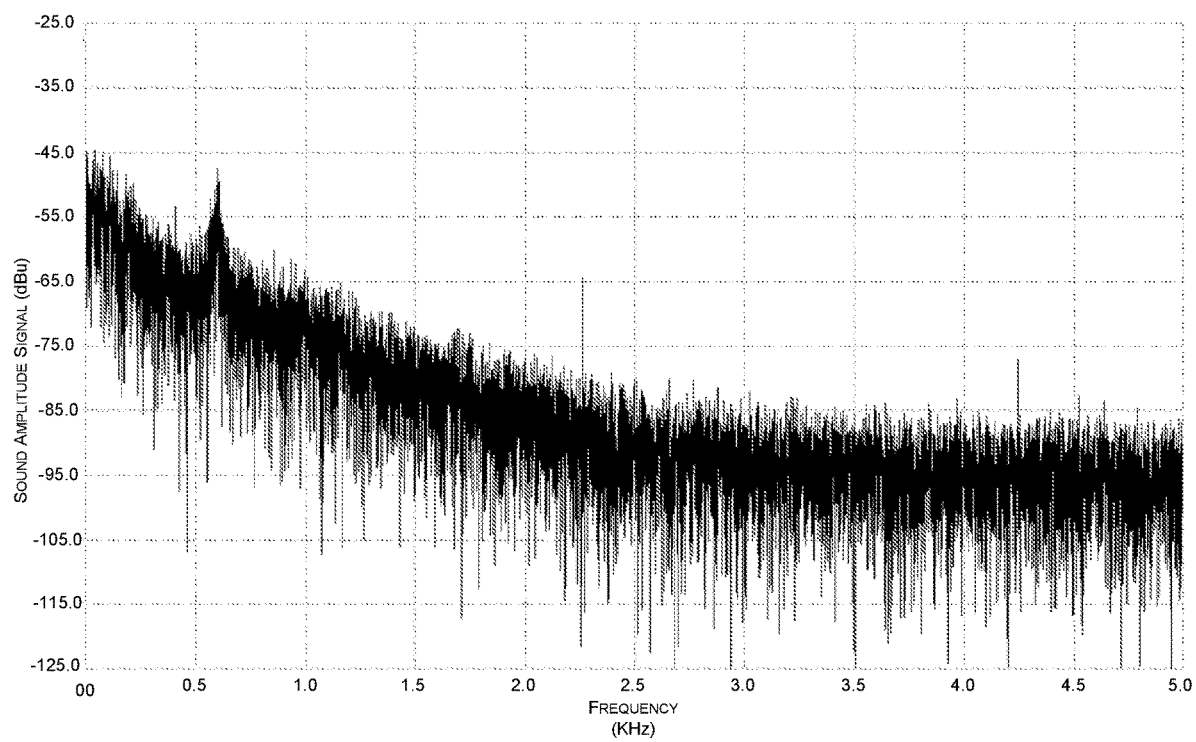
FIG. 8A is an exemplary frequency spectra of output jet obtained with a microphone outside the flow field, according to the embodiments herein.
Figure 8B:
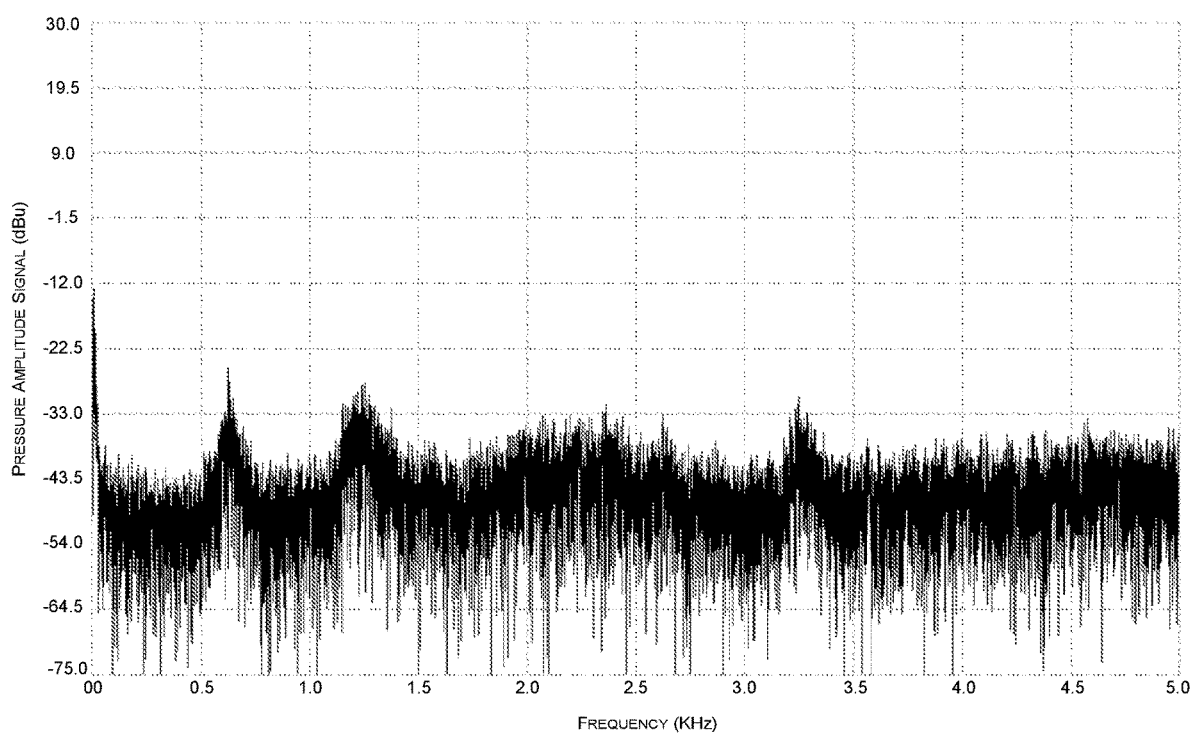
FIG. 8B is an exemplary spectra of output jet obtained with a pressure transducer in the flow field, according to the embodiments herein.

FIGS. 8A and 8B, with reference to FIGS. 1 through 7D, are exemplary spectra of output jet, wherein the frequency spectra shown in FIG. 8A was obtained with a microphone placed outside the flow field, and the frequency spectra shown in FIG. 8B was obtained with a pressure transducer in the flow field. The fundamental frequency of oscillation is 500 Hz in the sample data shown in these exemplary spectra. Variations of design can provide oscillations between 200 Hz to 800 Hz.

Figure 9:
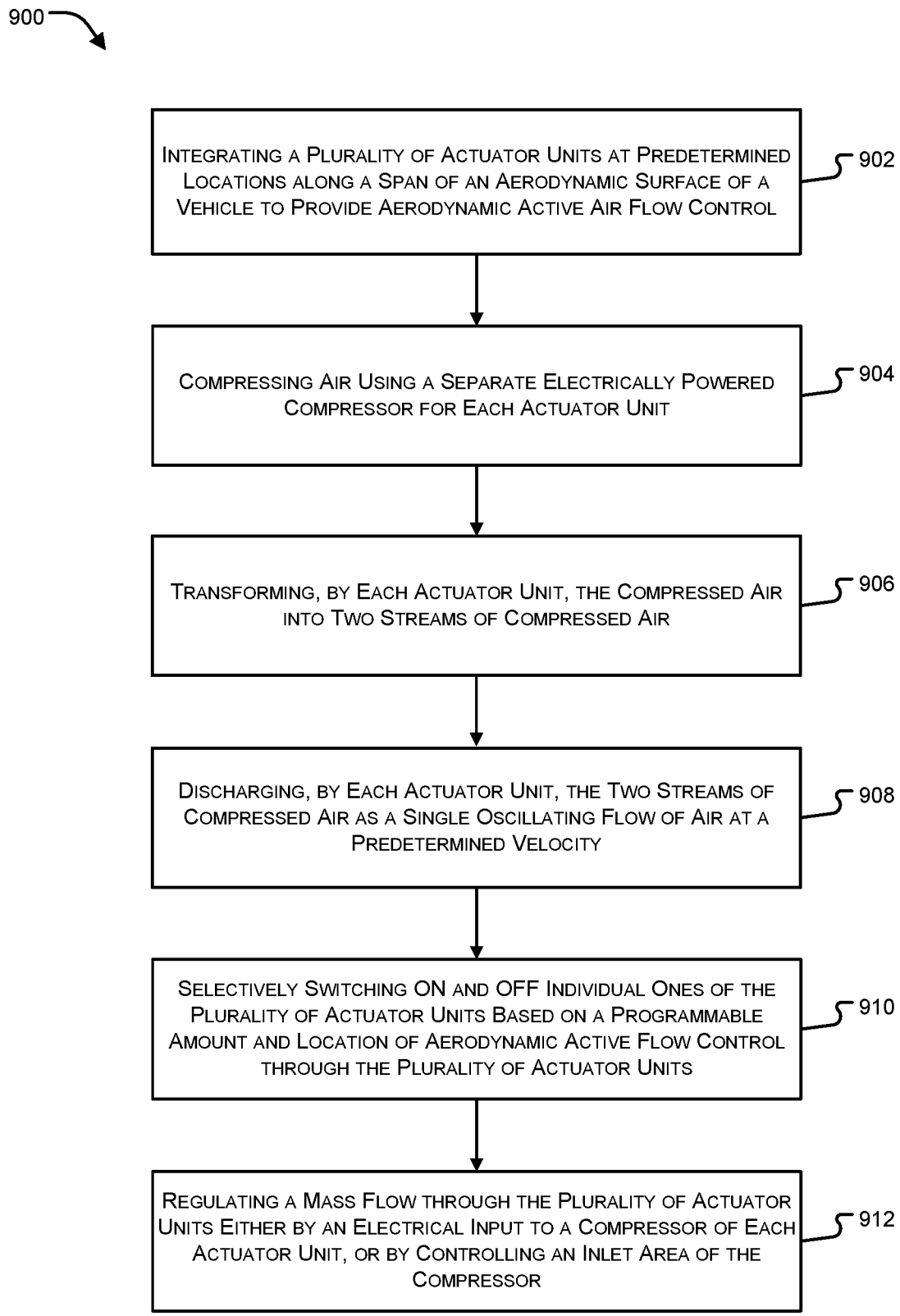
FIG. 9 is an exemplary flow diagram for a method of aerodynamic active flow control, according to the embodiments herein.

FIG. 9, with reference to FIGS. 1 through 8B, is an exemplary flow diagram for a method 900 of aerodynamic active air flow control. The method 900 comprises, at step 902, integrating a plurality of actuator units, such as actuator units 100 as shown in FIG. 1, at predetermined locations along a span of an aerodynamic surface of a vehicle to provide aerodynamic active air flow control, wherein each of the plurality of actuator units 100 can have a separate dedicated compressor 102, and is capable of producing a single oscillating exit jet 108 of air at a predetermined velocity and pressure. The method 900 at step 904 can compress air using the separate electrically powered compressor 102 dedicated to each actuator unit 100. At step 906 of the method 900, each actuator unit 100 can transform the compressed air into two streams 114 of compressed air, wherein transforming the compressed air into two streams 114 is done at a transitional component 104 that receives the compressed air from the dedicated compressor 102 and delivers the two streams 114 of the compressed air to a fluidic oscillator 106 comprising two inlets 110. At step 908 each actuator unit 100 discharges a single oscillating exit jet 108 of air at a predetermined velocity, wherein the single oscillating exit jet 108 of air is either in-plane or perpendicular to a plane defined by fluid flow through any one of the plurality of actuator units 100. The method 900 at step 910 includes selectively switching ON and OFF individual ones of the plurality of actuator units 100 based on a programmable amount and location of aerodynamic active flow control through the plurality of actuator units 100; and at step 912 includes regulating a mass flow through the plurality of actuator units 100 either by an electrical input to the compressor 102 of each actuator unit 100, or by controlling an inlet area 112/412 of the compressor 102/402.

In an embodiment, the outcome of control action implemented in accordance with the system 600 and method 900 provided by the embodiments herein on an aerial vehicle to increase aerodynamic lift and reduced aerodynamic drag on the vehicle by preventing flow separation at a given forward speed of the airplane. It also enables slower approach and take-off speeds of airplanes.

Thus, the embodiments herein provide an actuator unit 100 having one or more dedicated compressors 102/402 that minimizes total weight and volume of the aerodynamic flow control system 600 without compromising its performance. In addition, providing one or more dedicated compressors 102/402 for each actuator unit 100 provides the ability to electrically switch ON and OFF each individual actuator unit 100 depending on the amount and location of actuation needed. This reduces complexity and weight as heavy valves that control operation of the individual actuators in the conventional arrangement, are no longer required.

The aerodynamic flow control system 600 provided by the embodiments herein also provides a possibility of varying the amount of actuation from each individual actuator unit 100 depending on the external flow of air, which can be performed by a processor 604 operatively coupled to a plurality of actuator units 100, based on feedback from sensors 602 attached to each of the plurality of actuator units 100, for individual or discrete flow control.

A plurality of actuator units 100 provide for an in-built redundancy, and therefore, the arrangement of an individual air source for each actuator unit 100 also mitigates risk of complete system failure as can happen with conventional systems that are dependent on an Auxiliary Power Unit (APU) of the aircrafts which is mainly used for passenger-comfort air handling during flights.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. An aerodynamic flow control system comprising:
a plurality of actuator units integrated at predetermined locations along a span of an aerodynamic surface of a vehicle to provide aerodynamic active air flow control, wherein each of the plurality of actuator units comprises:
an electrically powered compressor to compress air;
a transitional component to receive the compressed air from the compressor and provide two streams of the compressed air; and
a fluidic oscillator comprising two inlet ports that receive the two streams of the compressed air, and an exit port that discharges a single oscillating flow of air at a predetermined velocity, wherein the transitional component comprises a flexible material, and wherein the transitional component is configured to orient the single oscillating flow of air in relation to a flow of air external to an actuator unit.

2. The aerodynamic flow control system of claim 1, wherein the fluidic oscillator comprises a feedback-free fluidic oscillator, and wherein the transitional component is to provide two equal streams of the compressed air to the two inlet ports of the fluidic oscillator.

3. The aerodynamic flow control system of claim 1, wherein the single oscillating flow of air is either in-plane or perpendicular to a plane defined by fluid flow through any one of the plurality of actuator units.

4. The aerodynamic flow control system of claim 1, wherein the electrically powered compressor has a capacity to provide output of up to approximately 180 kg/hour at a pressure of up to approximately 100 psi.

5. The aerodynamic flow control system of claim 2, wherein the transitional component comprises a transition flow geometry that divides a flow of the compressed air from the single compressor into two equal parts for feeding the two streams of the compressed air to the two inlet ports of the fluidic oscillator, and further conditions the two streams for uniformity in the form of two converging nozzles that act as inputs to the feedback-free fluidic oscillator.

6. The aerodynamic flow control system of claim 2, wherein the each of the plurality of actuator units are configured to independently provide two equal streams of the compressed air to each of the two inlet ports of the fluidic oscillator such that each of the two equal streams is conditioned for uniformity in the form of two converging nozzles that act as inputs to the feedback-free fluidic oscillator.

7. The aerodynamic flow control system of claim 1, wherein flexibility of the transitional component allows air flow adjustments in all three planes relative to the aerodynamic surface.

8. The aerodynamic flow control system of claim 1, wherein the fluidic oscillator is to provide an oscillation between approximately 200-800 Hz.

9. The aerodynamic flow control system of claim 1, wherein each of the plurality of actuator units comprises a battery pack for supplying electric power to the electrically powered compressor.

10. The aerodynamic flow control system of claim 1, wherein the compressor is individually switched ON and OFF based on a programmable amount and location of aerodynamic active air flow control through the plurality of actuator units.

11. The aerodynamic flow control system of claim 1, wherein an amount of mass flow through the fluidic oscillator is regulated either by an electrical input to the compressor, or by controlling an inlet area of the compressor.

12. The aerodynamic flow control system of claim 1, wherein the plurality of actuator units are arranged into an array on a planar surface structure.

13. The aerodynamic flow control system of claim 1, wherein the exit port of the fluidic oscillator of each of the plurality of actuator units are configured in a single plane.

14. The aerodynamic flow control system of claim 1, wherein the plurality of actuator units are arranged in a row.

15. An aerodynamic flow control system comprising:
a plurality of actuator units integrated at predetermined locations along a span of an aerodynamic surface of a vehicle to provide aerodynamic active air flow control, wherein each of the plurality of actuator units comprises:
an electrically powered compressor to compress air;
a transitional component to receive the compressed air from the compressor and provide two streams of the compressed air; and
a fluidic oscillator comprising two inlet ports that receive the two streams of the compressed air, and an exit port that discharges a single oscillating flow of air at a predetermined velocity,
wherein the transitional component comprises a flexible material, and wherein the transitional component is configured to orient the single oscillating flow of air in relation to a flow of air external to an actuator unit;
a sensor attached to each of the plurality of actuator units to capture air flow data related to the actuator unit; and
a processor operatively connected to each sensor and each of the plurality of actuator units to compare the air flow data to a predetermined air flow threshold, and control an operation of the plurality of actuator units based on the comparison.

16. A method comprising:
integrating a plurality of actuator units at predetermined locations along a span of an aerodynamic surface of a vehicle to provide aerodynamic active air flow control;
compressing air using a separate electrically powered compressor for each actuator unit;
transforming, by each actuator unit, the compressed air into two streams of compressed air using a transitional component; and
discharging, by each actuator unit, the two streams of compressed air as a single oscillating flow of air at a predetermined velocity, wherein the single oscillating flow of air is either in-plane or perpendicular to a plane defined by fluid flow through any one of the plurality of actuator units,
wherein the transitional component comprises a flexible material, and wherein the transitional component is configured to orient the single oscillating flow of air in relation to a flow of air external to an actuator unit.

17. The method of claim 16, comprising selectively switching ON and OFF individual ones of the plurality of actuator units based on a programmable amount and location of aerodynamic active flow control through the plurality of actuator units.

18. The method of claim 16, comprising regulating a mass flow through the plurality of actuator units either by an electrical input to a compressor of each actuator unit, or by controlling an inlet area of the compressor.

19. The method of claim 16, comprising arranging the plurality of actuator units into an array on a planar surface structure.

20. The method of claim 16, wherein flexibility of the transitional component allows air flow adjustments in all three planes relative to the aerodynamic surface.

* * * * *